Patented Mar. 26, 1940

2,194,958

UNITED STATES PATENT OFFICE 2,194,958

AQUEOUS DISPERSION OF POLYMERIZED HYDROCARBON MATERIAL AND METHOD OF PREPARING THE SAME

Andrew Szegvari, Fairlawn, and Adrian H. Feikert, Wadsworth, Ohio, assignors to American Anode Inc., Akron, Ohio, a corporation of Delaware No Drawing. Application December 8, 1939, Serial No. 308,220

13 Claims. (Cl. 260—759)

The invention relates to artificially prepared aqueous dispersions of resilient solid hydrocarbon polymerization products of high molecular weights and to methods of preparing such dispersions. More particularly, the invention is concerned with the dispersion of certain permanently resilient paraffinic materials prepared by polymerizing iso-olefins of low molecular weight. Examples of such materials are the resilient polymers which recently have appeared on the market in the United States under the trade-names "Vistanex" and "Vispronal", and for a time also under the name "Viskanol".

Only meager information concerning these commercial products has been made public, but it is understood that they are prepared by polymerizing certain vapor fractions produced in cracking petroleum to make cracked gasoline. Thus, it appears that fractions containing considerable quantities of iso-butylene possibly admixed with other olefins and iso-olefins may be polymerized under suitable conditions to produce solid resilient polymers which, apparently depending upon the particular method of polymerization employed, may consist practically entirely of polymerized iso-butylene, or may consist principally of polymerized iso-butylene in admixture, however, with some other polymerized olefins. It is also understood that other related olefins and iso-olefins may be polymerized in a similar manner to produce similar resilient solid polymers. The resilient products now being supplied commercially are believed to consist very largely of polymerized iso-butylene.

Such polymers are produced with widely varying average molecular weights and correspondingly widely varying physical properties. The present invention is concerned, however, only with the solid, resilient polymers in the upper range of molecular weights and is not concerned with the lower molecular weight polymers having liquid and liquid-like characteristics. Such lower liquid and liquid-like polymers may be emulsified directly by known processes but the permanently resilient, solid polymers cannot be satisfactorily dispersed in water directly by any method known to applicants prior to the present invention. To indicate the distinct differences between the two classes of materials, it may be noted that the Advance Solvents & Chemical Corp. of New York markets four grades of "Vistanex" which are described in their sales literature in the following terms:

"Vistanex 7,000—a soft, very viscous sticky product."
"Vistanex No. 6—soft, plastic, very sticky."
"Vistanex Medium—tough, dry, elastic, rubbery, similar to white crepe rubber in appearance."
"Vistanex High Molecular Weight—similar to Vistanex medium but still stronger physically."

The first two materials, "Vistanex 7,000", and "Vistanex No. 6", are non-resilient in character while the second two materials, "Vistanex Medium" and "Vistanex High Molecular Weight", are permanently resilient, tough solids of the character dispersed in the present invention. According to the sales agents, the average molecular weight of the polymer supplied as "Vistanex No. 6" is around 17,000 while the average molecular weight of the polymer supplied as "Vistanex Medium" is from 50,000 to 75,000. No intermediate polymers are available commercially. Applicants have, however, obtained some experimental polymers in the intermediate range and, based on the supplier's information concerning the average molecular weights of these experimental samples, it appears that the boundary line between the non-resilient liquid and liquid-like polymers with which this invention is in no way concerned and the resilient solid polymers which are dispersed in the invention lies somewhere in the neighborhood of an average molecular weight of 25,000 to 30,000. This is consistent with such published data as has come to applicants' attention. Thus, U. S. Patent No. 2,138,895 granted to Peter J. Wiezevich and assigned to Standard Oil Development Company (the manufacturers in this country of "Vistanex") recognizes a clear distinction in physical properties between polymers of iso-butylene having molecular weights "between the approximate limits of 800 to 5,000 or 10,000 or even 15,000 or more" which are characterized as being "plastic", and the polymers having "a much higher molecular weight such as 30,000 or 50,000 up to 100,000 or 200,000 or even 500,000", which are characterized as being "elastic" instead of plastic.

Chemically, the polymerized olefins here under consideration are paraffinic in nature as they have a practically saturated aliphatic hydrocarbon constitution containing only carbon and hydrogen and, as would be expected from the paraffinic structure, are relatively inert chemically and quite repellent to water.

Physically, the resilient solid, high molecular weight polymerized olefins are tough but quite resilient and elastic. They are not thermoplastic in any proper sense as they cannot be melted and solidified without change but are decomposed by heating apparently to produce the liquid polymers of lower molecular weights. They are not appreciably plasticized by intensive mechanical working of the character employed for plasticizing rubber, for example, but retain their resiliency substantially unimpaired after long continued mechanical working of the most intensive character.

This unusual combination of properties makes the resilient polymers potentially valuable in many industrial applications if any convenient and really practical way of working and utilizing them were known, but none has heretofore been suggested. As the materials are not thermoplastic and are not appreciably plasticized by mechanical working, they cannot be molded satisfactorily. Furthermore, they are soluble only to a slight degree in known solvents to give extremely viscous solutions of very low concentration which are of little practical use, and no feasible method for colloidally dispersing these resilient solids has, in so far as applicants are aware, heretofore been suggested.

It was felt however, in view of the non-plastic and difficulty soluble characteristics of the materials, that the only practical means of utilizing them commercially lay in preparing artificial dispersions of the materials, and efforts were therefore directed toward that end notwithstanding the obvious difficulties presented by the permanently resilient and non-plastic character of the materials. As was expected, known methods of dispersing liquid, plastic, and plasticizable materials proved ineffective for dispersing the permanently resilient polymers of iso-butylene such as "Vistanex Medium", but after considerable research and development work, a method has been devised by which these permanently resilient products may be colloidally dispersed in water to produce aqueous dispersions useful in many industrial applications, some of which will be hereinafter described. The method of the present invention may be most readily understood by considering illustrative examples of the process, several of which follow:

*Example 1.*—2000 grams of an elastic resilient solid hydrocarbon polymerization product such as "Vistanex Medium" are placed in a jacketed internal mixer of the Werner-Pfleiderer type and subjected to sufficient mechanical working to expel substantially all the occluded air as evidenced by a more translucent appearance. Long continued working of the material at this stage is futile as it will not be appreciably plasticized thereby. Next, there is slowly added with continued working, 600 c. c. of a solvent such as a so-called "Safety Solvent" which will soften the hydrocarbon material and, after addition of the solvent is complete, the mixture is worked for thirty to forty-five minutes to form a homogeneous and somewhat more workable but still solid mass. To this mixture there is added 400 grams of rubber which has previously been thoroughly plasticized by mechanical working continued for two hours, and the mixture is thoroughly homogenized by mechanical working in the mixer continued usually for about fifteen minutes. The temperature of the hydrocarbon-solvent-rubber mixture is then raised to 190°–200° F. by admitting steam to the jacket of the mixer, and that temperature is maintained, while working is continued, for an hour to an hour and a half to drive all the solvent out of the mixture, after which the temperature is lowered to normal or room temperature and preferably is maintained at such temperature during the succeeding operations.

Next, about 150 grams of oleic acid are slowly added and worked into the 2400 gram mixture. In some instances, however, it will be found advantageous in securing more rapid homogenization to add the oleic acid before all the solvent has been driven from the mixture. Then about 40 grams of potassium hydroxide in the form of a 45% aqueous solution are added to saponify the oleic acid. When the soap-forming ingredients have been thoroughly incorporated, 240 c. c. of an alkaline aqueous solution containing 10 grams of a proteinous colloid such as casein per 100 c. c. of solution are added and worked into the mixture. As mechanical working is continued, water is added in 10 to 20 c. c. portions until the mixture inverts, that is until the aqueous phase becomes continuous and the hydrocarbon phase discontinuous, which will be evidenced by a marked change in appearance of the batch. Finally, 50 c. c. of 26% ammonia are added followed by sufficient water to dilute the dispersion to a desired concentration.

*Example 2.*—Proceed as in Example 1, substituting for the rubber, 500 grams of ester gum, for the potassium hydroxide and oleic acid, 160 grams of ammonium oleate, and for the casein, 40 grams of glue, the technique and procedure being similar to Example 1.

*Example 3.*—1000 grams of a resilient solid hydrocarbon polymerization product such as "Vistanex Medium" are placed upon a conventional 12 inch two-roll rubber mill with the rolls set as close together as possible and milled until the material forms a continuous sheet about one of the rolls, which will usually require about 5 minutes milling. Then the mill rolls are opened somewhat until the bank of material is reduced to a small size, and, with continued milling, 150 grams of a commercial asphalt having a melting point of around 180° F. are added in approximately 50 gram portions and worked into the hydrocarbon material by cutting the batch back and forth as in milling a rubber batch. After about ten minutes of such milling, or after the batch is homogeneous, 80 grams of oleic acid are added in 10 to 15 c. c. portions and thoroughly worked into the mixture on the mill. When the hydrocarbon-asphalt-oleic acid mixture becomes homogeneous, it is removed from the mill and placed in an internal mixer warmed to a temperature of about 150° F. With continued mechanical working in the mixer, there are added in succession and preferably in small portions, 20 c. c. of a 45% aqueous solution of potassium hydroxide, and 100 c. c. of an alkaline aqueous solution of casein containing 10 grams of solid casein. The temperature is then lowered to normal as in Example 1 and water is added slowly as the batch is worked until the mixture inverts and the aqueous phase becomes continuous, after which about 50 c. c. of 26% ammonia solution are added followed by water required to dilute the dispersion to a desired concentration.

The dispersions prepared according to the foregoing three examples are quite stable and are true colloidal dispersions in which the average particle size is substantially less than 1.0 micron with probably half the particles under 0.50 micron in diameter. Such dispersions have been prepared with a total solids content as high as 70%.

Equivalent materials may be substituted for those mentioned in the foregoing specific examples. The "Safety Solvent" recited in Example 1, which is a commercially available petroleum product having a distillation range somewhat above ordinary gasoline and consisting principally of slowly volatile paraffin hydrocarbons around and including octane, may be replaced by similar solvents such as toluol, xylol, mineral spirits, naphtha, or other hydrocarbon solvent capable of softening the tough polymerization products being dispersed. Instead of the rubber of Example 1, (which is understood to include both natural and synthetic rubbers and rubber-type materials as well as analogous gums and resins such as gutta percha and balata) or the ester gum of Example 2, or the asphalt of Example 3, which are preferred materials, we may use, in proportions varying from about 15% to 100%, rubber derivatives prepared by treating rubber with sulfonic acids, rubber degradation products obtained by dry distilling rubber including both the volatile oils and the solid residues so produced, chlorinated diphenyl, chlorinated naphthalene, rosin, poly-ethylene dihalides such as the commercial product "A. X. F.", and like materials which themselves may be artificially dispersed in water and which are compatible and capable of being homogeneously blended with the hydrocarbon polymerization products being dispersed. These materials for the sake of brevity will be referred to simply as "conjunctive" materials as they are now believed to function at least in part to promote a union between the more inert polymerized solid hydrocarbon and the dispersing agents and/or to promote a proper phase relationship favorable to inversion, although it is not intended thereby to limit the invention to any particular theory of operation. Likewise the soaps, or soap-forming ingredients used as dispersing agents in the foregoing examples and the protective colloids may be replaced by other well-known dispersing agents and common protective colloids, broadly termed protective agents, such as any of the commonly used soaps, colloidal clays, gum arabic, and the like. The ammonia may be replaced by sodium or potassium hydroxide or other common alkali. In order to lower the temperature of the batch to normal or room temperature during the later stages of the process as in the specific examples, it will usually be necessary to remove at least a part of the considerable amount of heat generated by the intensive working of the tough batches by circulating water through the mixer jacket. No particular temperature is essential and ordinary tap water circulated through the jacket ordinarily will be entirely satisfactory although in warm weather it may be desirable to circulate refrigerated water in order to effect more rapid lowering of the temperature and more effective maintenance of the lowered temperature.

Especially satisfactory dispersions of both "Vistanex Medium" and "Vistanex High Molecular Weight", as well as dispersions of similar materials sold under other names, have been prepared according to the present process utilizing a Werner-Pfleiderer type internal mixer made by the J. H. Day Company of Cincinnati, Ohio, and sold under the trade-name "Mogul". The "Mogul" mixer was provided with a jacket and fittings for circulating hot or cold fluids about the mixer chamber and was equipped with two three-wing masticator type blades driven at differential speeds, one blade rotating at a speed of 20 R. P. M. and the other at a speed of 14 R. P. M.

The stable and easily handled dispersion containing as high as 70% total solids prepared by the present method provide a convenient and thoroughly practical means of utilizing the valuable properties of the hydrocarbon polymerization products described, and tests indicate that in many commercial applications exceptionally useful and technically important results may be obtained. The dispersion may be used alone, or it may be mixed with aqueous dispersions of one or more other materials such as dispersions of asphalt, rubber, synthetic rubber, Bakelite, poly acrylic resins, common waxes, and similar materials to blend the properties of the different substances. Mixture of relatively small amounts of the dispersion of this invention to natural rubber latex greatly improves certain properties such as resistance to chemicals and light, flex-resistance, etc., of rubber articles prepared from the latex. The rubber component of solid products produced from such compositions may be vulcanized to the hard rubber state without stiffening to produce an exceptionally flexible hard rubber article. Similarly, compounding materials such as zinc oxide, calcium carbonate, barytes, carbon black, coloring pigments and the like may be admixed in the form of colloidal dispersions with the present dispersions, or may be mixed into the solid mass before it is dispersed, to alter as required the properties of articles made from or treated with the dispersions.

The present dispersions have been mixed in quantities varying from 3% to 50% with paper pulp which has been found to produce paper greatly improved in strength and flexibility as well as in resistance to water and chemicals. Somewhat similarly the dispersions have been mixed with comminuted leather fibers or cotton or other fibers and formed into a sheet and dried to make artificial leather surpassing prior products in resistance to water permeation, strength and flexibility.

Textile fabrics of various kinds have been water-proofed and gas-proofed with the present dispersions. Balloon fabric impregnated with the dispersion and dried exhibits exceptional strength and low permeability to gases. Silk hose impregnated with a dilute dispersion containing around 15% total solids and then passed through a wringer to remove most of the associated dispersion and thereafter dried, exhibited exceptional flexibility, excellent resistance to "laddering" and tearing, unusually long life and good resistance to repeated washings, and are free from objectionable odors and surface tackiness which have prevented widespread adoption of previously prepared materials for treating silk hose. Leather goods in general, and conveyor and transmission belts of both leather and fabric are improved by treatment with the present dispersions.

A mass of glass wool in suitable form impregnated with the present dispersions provides efficient filters for air-conditioning systems and especially for filtering corrosive liquids or gases. Woven glass textile tapes impregnated with the present dispersions are especially useful for heat-resistant gaskets and as protective coatings for plating racks used in chromium and other plating baths. The chemical inertness of the hydrocarbon polymerization product also makes these dispersions valuable for treating clothing to be worn for protection against toxic gases and corrosive chemicals.

The dispersions of polymerized hydrocarbon may be spread in a film and dried to form a sheet, or films of the dispersion applied to an object may be dried in situ to form a protective coating furnishing efficient resistance to corrosion, and in the case of electrically conductive articles, providing excellent insulation. Tests indicate that such dried films are capable of remarkably high elongations in the range from 1500 to 2000% without breaking.

Objects may be coated by dipping in the dispersion one or more times and drying, and shaped objects may be made in a like manner by dipping a deposition form of suitable shape to which the dried dispersion will not adhere tenaciously, then drying, and stripping the dried coating from the form. In either case the thickness of solid material deposited at a single dip may be materially increased by coating the form with a coagulant for the dispersion and then dipping into the dispersion or by first dipping the form into the dispersion and then into the coagulant, and then back into the dispersion, and repeating this procedure any number of times. Among suitable coagulants may be mentioned formic acid, acetic acid, sulphuric acid, salts of polyvalent metals such as the chlorides or nitrates of calcium, magnesium or zinc, in solution in water, or in a volatile organic solvent such as acetone, alcohol or carbon tetra chloride.

While the present invention has been described in considerable detail with reference to certain preferred procedures, materials and uses, it is understood that the invention is not limited thereto and that numerous variations may be made in the procedures herein described, that equivalent materials may be substituted, and that many uses other than those mentioned are contemplated. All such modifications and variations are within the scope of the invention as defined by the appended claims.

This application is a continuation-in-part of our co-pending application Serial No. 83,356 filed June 3, 1936.

We claim:

1. The method of dispersing a high molecular weight resilient solid polymerization product having a substantially saturated aliphatic hydrocarbon constitution of the character described in an aqueous dispersion medium, which comprises admixing with the solid hydrocarbon product a substantial quantity of a conjunctive material capable of being dispersed in water and homogeneously blended with the hydrocarbon product, admixing a dispersing agent and water, and inverting the phases of the mixture.

2. The method of dispersing a high molecular weight resilient solid polymerization product having a substantially saturated aliphatic hydrocarbon constitution of the character described in an aqueous dispersion medium, which comprises admixing with the solid hydrocarbon product a substantial quantity of a conjunctive material having substantially the properties of a material selected from the class consisting of rubber, rubber derivatives, rubber degradation products, ester gum, rosin, asphalt, chlorinated diphenyl, and chlorinated naphthalene, admixing a dispersing agent and water, and working the mixture until inversion occurs.

3. The method of dispersing a tough, elastic and resilient high molecular weight solid polymerization product having a substantially saturated aliphatic hydrocarbon constitution, which comprises treating the solid hydrocarbon product with a softening agent, admixing a substantial quantity of a conjunctive material capable of being dispersed in water and homogeneously blended with the solid hydrocarbon product, admixing a dispersing agent and water, and working the mixture until inversion occurs.

4. The method of dispersing a tough, elastic, and resilient, high molecular weight solid polymerization product having a substantially saturated aliphatic hydrocarbon constitution, which comprises treating the solid hydrocarbon product with a softening agent, admixing a substantial quantity of a conjunctive material having substantially the properties of a material selected from the class consisting of rubber, rubber derivatives, rubber degradation products, ester gum, rosin, asphalt, chlorinated diphenyl, and chlorinated naphthalene, admixing a dispersing agent and water and working the mixture until inversion occurs.

5. The method of dispersing a tough, elastic and resilient, high molecular weight solid polymerization product having a substantially saturated aliphatic hydrocarbon constitution, which comprises treating the solid hydrocarbon product with a quantity of liquid hydrocarbon solvent sufficient substantially to soften the product and to reduce it to a workable condition for admixture of dispersion-promoting material, admixing such dispersion-promoting material, and adding water with working continued until the mixture inverts.

6. The method of dispersing a tough, elastic and resilient, high molecular weight solid polymerization product having a substantially saturated aliphatic hydrocarbon constituion, which comprises treating the solid hydrocarbon product with a substantial quantity of a volatile liquid solvent sufficient substantially to soften the product and to reduce it to a workable condition for admixture of dispersion-promoting material, admixing at least a part of such material to be added, evaporating substantially all the solvent from the mixture, thereafter adding any remaining dispersion-promoting material, adding water, and working the mixture until inversion occurs.

7. The method of dispersing a tough, elastic, and resilient, high molecular weight solid polymerization product having a substantially saturated aliphatic hydrocarbon constitution of the character described, which comprises reducing the hydrocarbon product to a workable condition for admixture of dispersion-promoting materials, admixing a substantial quantity of a conjunctive material blendable with the hydrocarbon product, admixing a saponaceous dispersing agent, admixing a proteinous protective colloid, and adding water with continued mechanical working until the mixture inverts.

8. The method of dispersing a tough, elastic and resilient, high molecular weight solid polymerization product having a substantially saturated aliphatic hydrocarbon constitution of the character described, which comprises reducing the hydrocarbon product to a workable mass, substantially uniformly incorporating a dispersing agent throughout the mass, adding water and working it into the mass to form a water-in-oil type dispersion and adding additional water with further mechanical working continued until the mixture inverts to produce an oil-in-water type dispersion with the hydrocarbon polymerization product in the discontinuous phase of the aqueous dispersion.

9. The method of preparing an artificial aqueous dispersion of solid, resilient poly iso-butylene, which comprises subjecting the poly iso-butylene to intensive mechanical working, admixing with the solid poly iso-butylene, while continuing such working, not less than 15% by weight of a conjunctive material itself capable of being dispersed in water and homogeneously blended with the poly iso-butylene, and which is capable of effecting a phase relation in the polyisobutylene conductive to dispersion; then admixing a dispersing agent and water, and continuing the mechanical working until the phases of the mixture invert and the water phase becomes continuous.

10. An artificial aqueous dispersion containing colloidally dispersed solid particles comprising a high molecular weight resilient solid polymerization product having a substantially saturated aliphatic hydrocarbon constitution suspended in an aqueous dispersion medium containing a protective agent, which dispersion has been prepared by the method of claim 1.

11. An artificial aqueous dispersion containing colloidally dispersed solid particles comprising a high molecular weight resilient solid polymerization product having a substantially saturated aliphatic hydrocarbon constitution suspended in an aqueous dispersion medium containing a protective agent, which dispersion has been prepared by the method of claim 2.

12. An artificial aqueous dispersion containing colloidally dispersed solid particles comprising a tough, elastic and resilient, high molecular weight solid polymerization product having a substantially saturated aliphatic hydrocarbon constitution suspended in an aqueous dispersion medium containing a protective agent, which dispersion has been prepared by the method of claim 8.

13. An artificial aqueous dispersion containing colloidally dispersed solid particles comprising solid, resilient poly iso butylene suspended in an aqueous dispersion medium containing a dispersing agent, which dispersion has been prepared by the method of claim 9.

ANDREW SZEGVARI.
ADRIAN H. FEIKERT.

CERTIFICATE OF CORRECTION.

Patent No. 2,194,958. March 26, 1940.

ANDREW SZEGVARI, ET AL.

It is hereby certified that error appears in the printed specification of the above numbered patent requiring correction as follows: Page 1, second column, line 33, for "whoch" read --which--; page 3, first column, line 65, for "dispersion" read --dispersions--; page 4, second column, line 23, claim 6, for "constituion" read --constitution--; line 73, claim 9, for "conductive" read --conducive--; and that the said Letters Patent should be read with this correction therein that the same may conform to the record of the case in the Patent Office.

Signed and sealed this 9th day of July, A. D. 1940.

(Seal)

Henry Van Arsdale,
Acting Commissioner of Patents.